(12) United States Patent
Lee

(10) Patent No.: US 8,872,789 B2
(45) Date of Patent: Oct. 28, 2014

(54) METHOD AND APPARATUS CONTROLLING TOUCH SENSING SYSTEM AND TOUCH SENSING SYSTEM EMPLOYING SAME

(75) Inventor: Chang-ju Lee, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 443 days.

(21) Appl. No.: 13/085,624

(22) Filed: Apr. 13, 2011

(65) Prior Publication Data

US 2011/0273399 A1 Nov. 10, 2011

(30) Foreign Application Priority Data

May 4, 2010 (KR) .......................... 10-2010-0042086

(51) Int. Cl.
*G06F 3/045* (2006.01)
*G06F 3/041* (2006.01)
(52) U.S. Cl.
CPC .................................. *G06F 3/0418* (2013.01)
USPC ........................................................ 345/174
(58) Field of Classification Search
CPC ................................................... G06F 3/0418
USPC ............................ 345/172–174; 324/662, 649
See application file for complete search history.

(56) References Cited

U.S. PATENT DOCUMENTS

| | | | | |
|---|---|---|---|---|
| 2002/0024344 A1* | 2/2002 | Kato et al. | ..................... | 324/662 |
| 2006/0202969 A1* | 9/2006 | Hauck | ............................ | 345/173 |
| 2009/0032312 A1* | 2/2009 | Huang et al. | ............... | 178/18.06 |
| 2009/0250268 A1* | 10/2009 | Staton et al. | ............... | 178/18.06 |
| 2010/0127717 A1* | 5/2010 | Cordeiro et al. | .............. | 324/678 |
| 2011/0025348 A1* | 2/2011 | Chetham et al. | .............. | 324/649 |

FOREIGN PATENT DOCUMENTS

| | | |
|---|---|---|
| JP | 05205556 A | 8/1993 |
| JP | 06175782 A | 6/1994 |
| KR | 1020060052547 A | 5/2006 |
| KR | 1020070077190 A | 7/2007 |

* cited by examiner

*Primary Examiner* — Quan-Zhen Wang
*Assistant Examiner* — Tony Davis
(74) *Attorney, Agent, or Firm* — Volentine & Whitt, PLLC

(57) ABSTRACT

A method of calibrating a touch sensing system includes connecting an impedance load to a touch sensing signal path in a gain adjustment mode, adjusting a gain of an amplifier that amplifies a signal input to the touch sensing signal path in the gain adjustment mode by evaluating an output signal of the amplifier, and disconnecting the impedance load from the touch sensing signal path after adjusting the amplifier gain.

18 Claims, 14 Drawing Sheets

METHOD AND APPARATUS CONTROLLING TOUCH SENSING SYSTEM AND TOUCH SENSING SYSTEM EMPLOYING SAME

CROSS-REFERENCE TO RELATED APPLICATIONS

This application claims the benefit of Korean Patent Application No. 10-2010-0042086 filed on May 4, 2010, the subject matter of which is hereby incorporated by reference.

BACKGROUND OF THE INVENTION

The present inventive concept relates to a method and apparatus controlling a touch sensing system. More particularly, the inventive concept relates to a method and apparatus performing calibration of a touch sensing system.

Touch sensing systems and touch sensing apparatuses are widely used in a variety of digital electronic and consumer products. Serving as input devices, these systems and apparatuses provide an interface between a user and the incorporating product. Information may be communicated through the touch sensing system by direct human contact (e.g., a finger) or by means of an input tool, such as a stylus pen. Touch sensing systems and apparatuses generally require precise yet quickly performed calibration routines that take into account a number of performance and environmental factors.

SUMMARY OF THE INVENTION

Embodiments of the inventive concept provide methods of calibrating a touch sensing system that are precise and quick. Such methods may be effectively used to adjust the gain of a constituent amplifier used to amplify a touch sensing signal under the control of a touch controller. Embodiments of the inventive concept also provide a calibration apparatus for a touch sensing system that precisely and quickly adjusts the gain of an amplifier used to amplify a touch sensing signal. Embodiments of the inventive concept also provide a touch sensing system employing a calibration apparatus for precisely and quickly adjusting the gain of an amplifier used to amplify a touch sensing signal. Other embodiments of the inventive concept provide a computer readable recording medium having recorded thereon a program code to execute a method of precisely and quickly adjusting the gain of an amplifier used to amplify a touch sensing signal.

According to an aspect of the inventive concept, there is provided a method of calibrating a touch sensing system including a touch panel, the method comprising; connecting an impedance load to a touch sensing signal path in a gain adjustment mode, adjusting an amplifier gain of an amplifier used to amplify a signal input to the touch sensing signal path in the gain adjustment mode by evaluating an output signal of the amplifier, and disconnecting the impedance load from the touch sensing signal path after the adjustment of the amplifier gain.

According to another aspect of the inventive concept, there is provided an apparatus calibrating a touch sensing system including a touch panel, the apparatus comprising; an impedance load, a switching unit connecting and disconnecting the impedance load with respect to a touch sensing signal path in response to a first control signal, an amplifier that amplifies a signal input to the touch sensing signal path using an amplifier gain determined in response to a second control signal, and a calibration controller that generates the first control signal to connect the impedance load to the touch sensing signal path in a gain adjustment mode, and the second control signal to adjust the amplifier gain by evaluating an output signal of the amplifier.

According to another aspect of the inventive concept, there is provided a touch sensing system comprising; a touch panel that outputs a touch sensing signal corresponding to a change in impedance of a sensing unit arranged at a plurality of sensing channels, and a touch sensing signal processor that receives the touch sensing signal from the touch panel and converts the received touch sensing signal to a signal, and outputs the signal, wherein the touch sensing signal processor comprises a calibration circuit that adjusts an amplifier gain amplifying a signal input to the touch sensing signal path in a state where an impedance load is connected to a touch sensing signal path in a gain adjustment mode, and the impedance load being disconnected from the touch sensing signal path after the adjustment of the amplifier gain.

According to another aspect of the inventive concept, there is provided an apparatus calibrating a touch sensing system including a touch panel, the apparatus comprising; an impedance load connected to a touch sensing signal path while the apparatus operates in a gain adjustment mode, and disconnected from the touch sensing signal path while the apparatus operates in a mode other than the gain adjustment mode, wherein an amplifier gain applied to a signal input to the touch sensing signal path is determined during the gain adjustment mode, and a parasitic capacitance compensation circuit that removes a parasitic capacitance generated from the touch sensing signal path during the gain adjustment mode.

BRIEF DESCRIPTION OF THE DRAWINGS

Embodiments of the inventive concept will be more clearly understood from the following detailed description taken in conjunction with the accompanying drawings in which.

DETAILED DESCRIPTION

Embodiments are presented by way of illustration to describe the making and use of the present inventive concept. However, the scope of the inventive concept is not limited to only the illustrated embodiments. Throughout the drawings and written description, like reference numbers and labels are used to denote like or similar elements.

A variety of sensing methods, such as a resistive overlay method and a capacitive overlay method, may be used to functionally enable a touch sensing method according to embodiments of the inventive concept. In the resistive overlay method, the location of a "touch input" may be determined by sensing a change in resistance at the location of the touch input. In the capacitive overlay method, the location of a touch input may be determined by sensing a change in capacitance at the location of the touch input.

Figure 1:
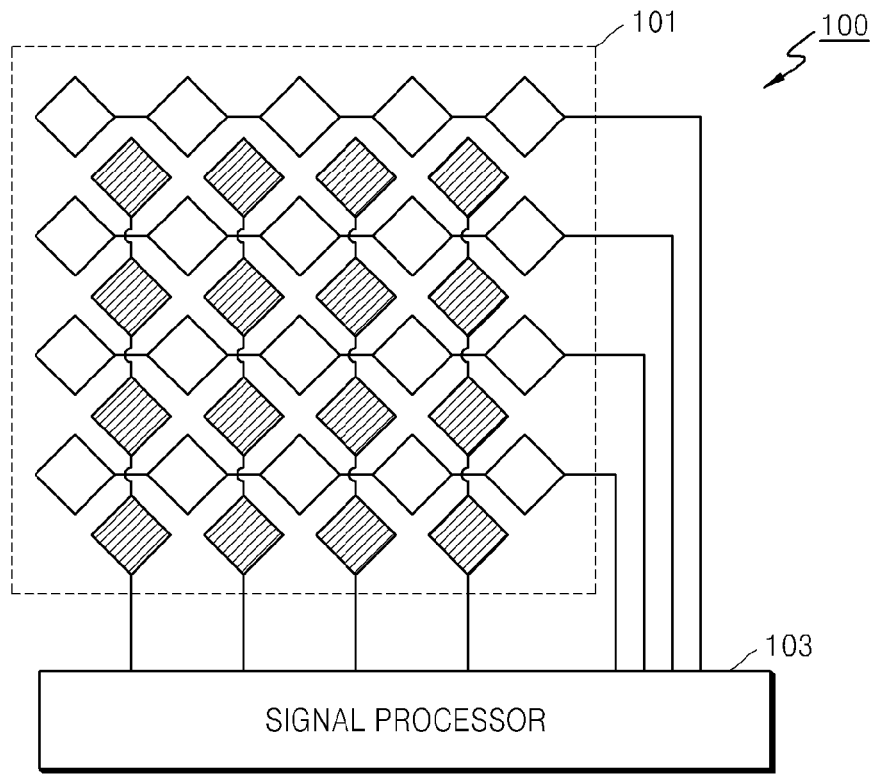
FIG. 1 illustrates a structure of a touch sensing system according to an embodiment of the inventive concept.

FIG. 1 illustrates a structure of a touch sensing system 100 according to an embodiment of the inventive concept. Referring to FIG. 1, the touch sensing system 100 generally comprises a touch panel 101 and a signal processor 103. The signal processor 103 may be referred to as a touch controller.

The touch panel 101 consists of a plurality of sensing units arranged in a row direction and a plurality of sensing units arranged in a column direction. The sensing units arranged in each row are electrically connected to each other. The sensing units arranged in each column are electrically connected to each other. A sensing unit generates a change in impedance at a location where a touch event occurs. That is, the sensing unit in a resistive overlay type touch panel generates a change in resistance at the location of a touch input. The sensing unit in a capacitive overlay type touch panel generates a change in capacitance at the location of the touch input.

The signal processor 103 outputs data to recognize a touch input location by processing a touch sensing signal corresponding to a change in impedance of the sensing unit of the touch panel 101. That is, the signal processor 103 processes a touch sensing signal corresponding to a change in resistance or capacitance at the location of the touch input, and outputs corresponding data that may be used to determine the location of the touch input.

Since the amplitude of a touch sending signal generated in the touch panel 101 is relatively small, the signal processor 103 must amplify the touch sensing signal and determines, using an amplified signal, whether the touch input is located. Accordingly, the touch sensing signal amplification performance, or touch sensitivity, may be determined according to a gain value associated with the amplifying of the touch sensing signal. Since the size of the touch area associated with the touch input will vary according to the touching implement (e.g., finger or stylus) the gain value must be adjustable across a defined range.

Additionally, the gain value may vary across similar products due to deviations in certain product (e.g., touch panel 101) fabrication processes and operating factors. Thus, the gain value must be capable of being dynamically adjusted over the defined range after the final assembly of the product (e.g., the touch panel 101 and/or signal processor 103). The process of adjusting the gain value will hereafter be referred to as a "calibration process", and may be implemented as a stand-alone process or within a larger system initialization process.

One possible method of calibrating a touch sensing system according to an embodiment of the inventive concept will now be described.

Figure 2:
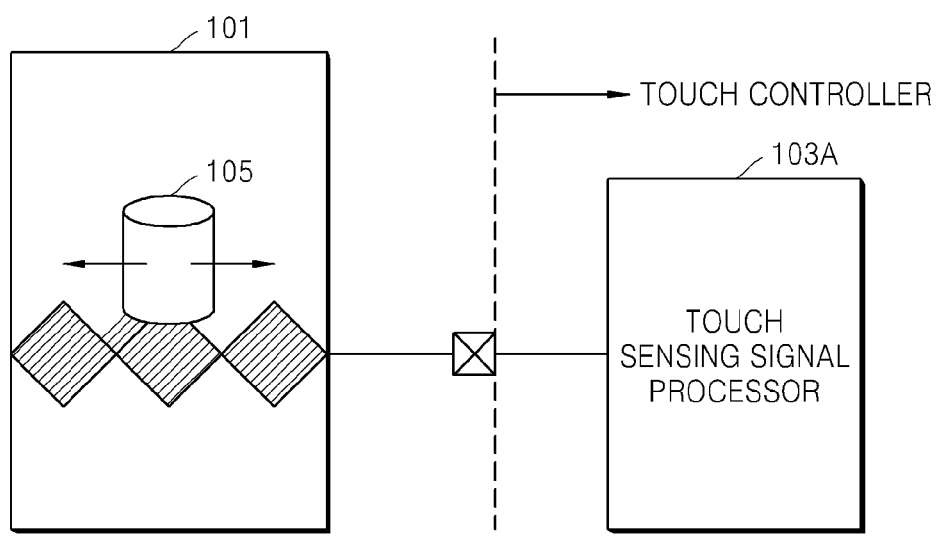
FIG. 2 is a block diagram of a touch sensing system according to an embodiment of the inventive concept.

FIG. 2 is a block diagram further illustrating a touch sensing system according to an embodiment of the inventive concept. Referring to FIG. 2, a calibration method according to an embodiment of the inventive concept may be implemented is a touch sensing signal processor 103A connected to the touch panel 101, and may be used to adjust an amplifier gain value when a conductive pillar 105 directly contacts the touch panel 101. Here again, the touch sensing signal processor 103A may be functionally operated and physically arranged as a touch controller.

However, this approach has certain drawbacks. Namely, the conductive pillar 105 may be mechanically moved and the detected state after a touch input is applied to the conductive pillar 105 should be maintained at the same position for a predetermined time in order to generate a stable touch input signal. To address this issue, a calibration method according to an embodiment of the inventive concept is provided.

Figure 3:
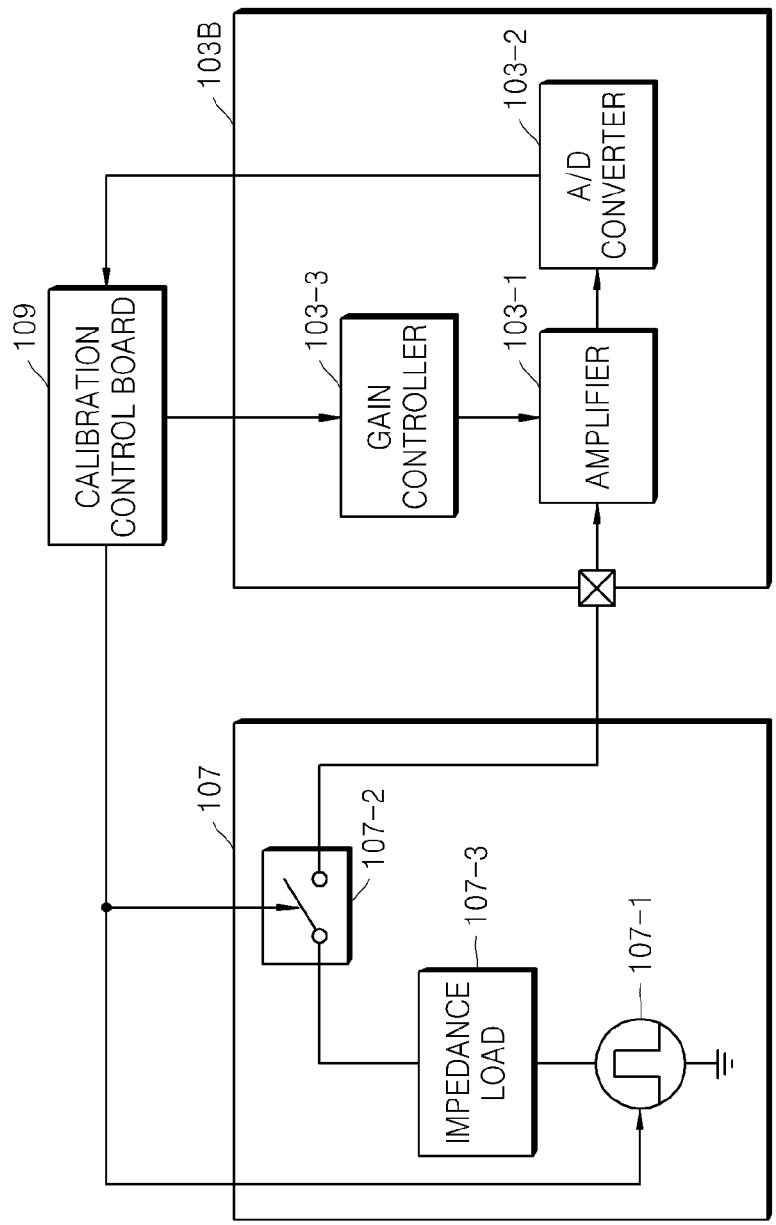
FIG. 3 is a diagram of a touch sensing system according to another embodiment of the inventive concept.

FIG. 3 is a diagram of a touch sensing system according to an embodiment of the present inventive concept. Referring to FIG. 3, the touch sensing system comprises a touch sensing signal processor 103B, an external test board 107, and a calibration control board 109.

The touch sensing signal processor 103B includes an amplifier 103-1, an analog/digital (A/D) converter 103-2, and a gain controller 103-3. The external test board 107 includes a pulse generator 107-1, a switching unit 107-2, and an impedance load 107-3.

The impedance load 107-3 may be implemented (e.g.,) with a resistor in a touch panel employing a resistive overlay type touch sensing method, or with a capacitor in a touch panel employing a capacitive overlay type touch sensing method. Alternatively, a capacitor may be used as the impedance load 107-3 in the touch panel employing a resistive overlay type touch sensing method, or a resistor may be used as the impedance load 107-3 in a touch panel employing a capacitive overlay type touch sensing method. That is, the impedance load 107-3 may be embodied by a resistor or a capacitor according to the structure of a circuit of the touch sensing signal processor 103B.

The amount of the impedance load 107-3 may be set to a suitable level according to the particular operating characteristics of the product incorporating the touch panel. In its operation, the calibration control board 109 generates a pulse generation control signal and a switch connection control signal needed for test gain adjustment. Accordingly, the pulse generator 107-1 generates a pulse in response to the pulse generation control signal, and the switching unit 107-2 is turned ON. The pulse signal generated by the pulse generator 107-1 passes through the impedance load 107-3 and the switching unit 107-2 and is input through a touch sensing signal path of the touch sensing signal processor 103B.

Then, the amplifier 103-1 amplifies a signal input through the touch sensing signal path by applying an initially set gain value to the signal, and then, outputs the amplified signal. The signal output from the amplifier 103-1 is converted to a digital value by the A/D converter 103-2, and transferred to the calibration control board 109.

The calibration control board 109 evaluates a digital value output from the A/D converter 103-2 and determines a gain value. That is, the calibration control board 109 determines a gain value such that, if the digital value is less than a lower limit value of a target range, the digital value is increased to be greater than a currently set gain value and, if the digital value is greater than an upper limit value of the target range, the digital value is decreased to be smaller than the currently set gain value. The gain value determined by the calibration control board 109 is transferred to the gain controller 103-3 of the touch sensing signal processor 103B.

The gain controller 103-3 adjusts the value of an element that determines the gain of the amplifier 103-1 according to the gain value determined by the calibration control board 109. Accordingly, the gain value of the amplifier 103-1 may be adjusted.

According to the method, since a gain value may be adjusted without using a conductive pillar in a touch panel, the drawback noted above may be effectively addressed. However, since the gain value is adjusted without connecting the touch sensing signal processor 103B directly to a touch panel, a parasitic capacitance component left on the touch sensing signal path of the touch panel is not taken into consideration so that a target gain value may not be accurately defined. This issue may be addressed by using a compensation circuit to remove the parasitic capacitance component. Nevertheless, a fine parasitic capacitance component is left in spite of the compensation circuit and thus the gain of the amplifier 103-1 may be badly affected. Also of note, the foregoing approach requires the use of the calibration control board 109.

Figure 4:
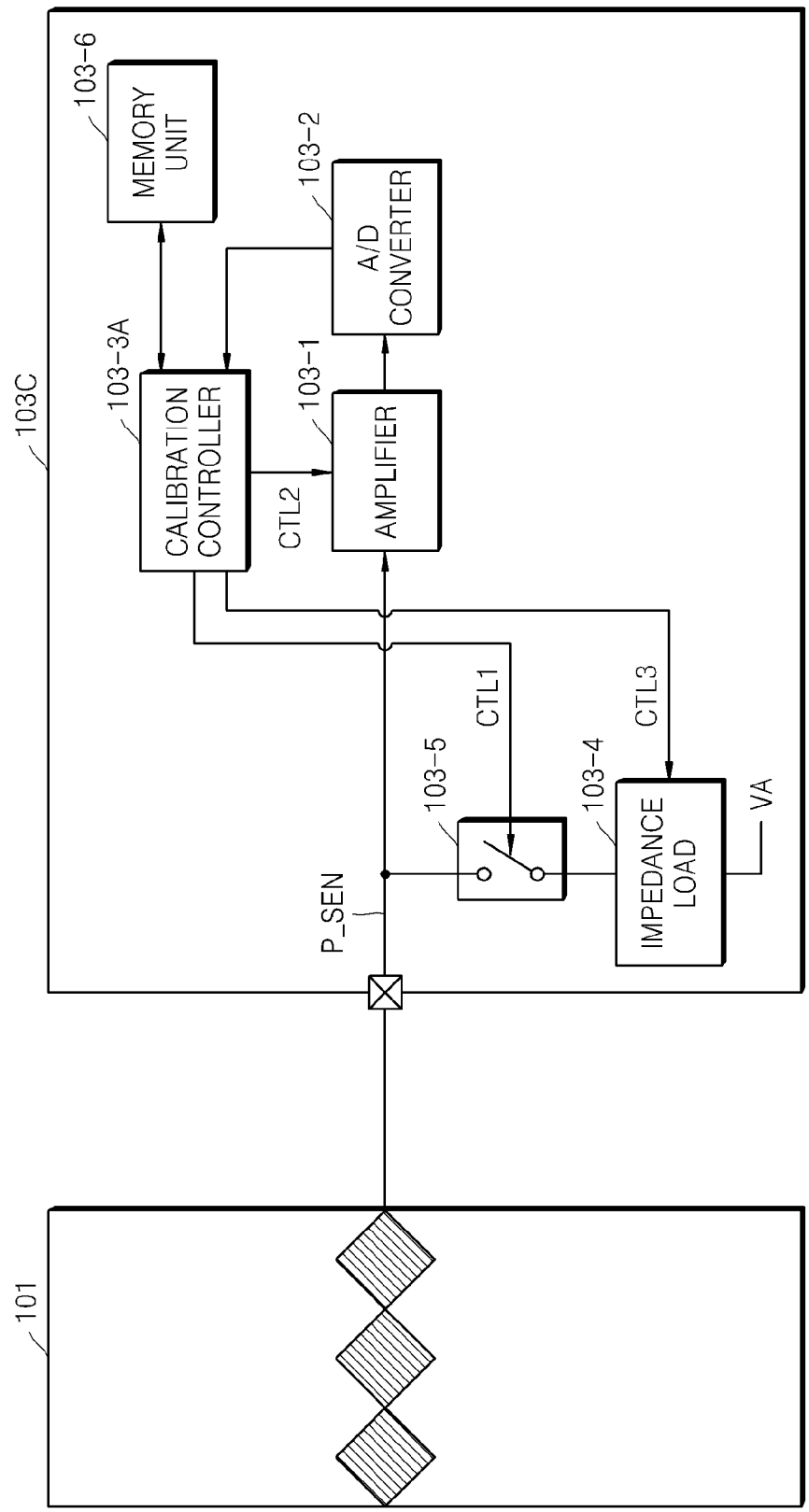
FIG. 4 is a diagram of a touch sensing system according to another embodiment of the inventive concept.

To address these cumulative issues, another calibration method is described below. FIG. 4 is a diagram of a touch sensing system according to another embodiment of the inventive concept.

Referring to FIG. 4, the touch sensing system comprises the touch panel 101 and a calibration apparatus 103C. The calibration apparatus 103C is capable of adjusting a gain value for determining touch sensitivity when the calibration apparatus 103C is connected to the touch panel 101.

The calibration apparatus 103C illustrated in FIG. 4 comprises the amplifier 103-1, the A/D converter 103-2, a calibration controller 103-3A, an impedance load 103-4, a switching unit 103-5, and a memory unit 103-6. The calibration apparatus 103C may be arranged in a signal processing block (not shown) for outputting data to recognize a touch input location by processing a touch sensing signal received from the touch panel 101, or in a touch controller (not shown) of the signal processing block. That is, the calibration apparatus 103C may be arranged in any circuit block of a circuit board or a chip that processes a touch sensing signal by being coupled to the touch panel 101.

The impedance load 103-4 and the switching unit 103-5 are connected in series between a touch sensing signal path P_SEN and a first voltage terminal VA. The impedance load 103-4 may be a variable impedance load of which impedance is adjusted by a third control signal CTL3. The impedance load 103-4 may be embodied with a resistor or a capacitor. The amount of the impedance load 103-4 may be set to a suitable level in accordance with the operating characteristics of the product incorporating a touch panel by the third control signal CTL3. The third control signal CTL3 may be generated, for example, by the calibration controller 103-3A, or by another controller or a processor in a circuit board or a chip that processes a touch sensing signal.

The first voltage terminal VA may be set to ground or another fixed voltage. Alternately, the voltage of the first voltage terminal VA may vary as a pulse or a variety of different voltages.

An operational calibration approach will now be described with reference to FIG. 4. The calibration controller 103-3A generates the third control signal CTL3 to set the amount of the impedance load 103-4 to correspond to the specification of a product employing the touch panel 101. Then, the amount of the impedance load 103-4 is set in response to the third control signal CTL3. That is, the amount of the impedance load 103-4 is set to be an input impedance value requested when a touch input is applied to a product incorporating the touch panel 101.

When the touch panel 101 and the calibration apparatus 103C are connected to each other, the calibration controller 103-3A generates a first control signal CTL1 to turn-on the switching unit 103-5 in a gain adjustment mode. Then, the switching unit 103-5 is turned on in response to the first control signal CTL1. Accordingly, in the gain adjustment mode, the impedance load 103-4 is electrically connected to the touch sensing signal path P_SEN.

The amplifier 103-1 amplifies and outputs a signal input through the touch sensing signal path P_SEN. The gain of the amplifier 103-1 is adjusted according to a second control signal CTL2. The amplifier 103-1 may amplify a signal with a gain set to a default value in the initial state.

The amplified signal output from the amplifier 103-1 is converted to a digital value by the A/D converter 103-2 and the digital value is input to the calibration controller 103-3A. The A/D converter 103-2 may be designed to be included in the calibration controller 103-3A. Although it is not shown in FIG. 4, a filter for removing noise may be arranged between the amplifier 103-1 and the A/D converter 103-2.

The calibration controller 103-3A generates the second control signal CTL2 for adjusting the gain of the amplifier 103-1 by evaluating a digital value for an output signal of the amplifier 103-1 in the gain adjustment mode. As an example, the calibration controller 103-3A determines whether the digital value of the output signal is included in a target range. If the digital value is less than a lower limit value of the target range, the calibration controller 103-3A generates the second control signal CTL2 to increase the gain. If the digital value is greater than an upper limit value of the target range, the calibration controller 103-3A generates the second control signal CTL2 to decrease the gain. Accordingly, the gain of the amplifier 103-1 is adjusted according to the second control signal CTL2.

When the digital value falls within the target range, the calibration controller 103-3A determines the gain of the amplifier 103-1 as a currently set gain and completes the gain adjustment mode. The calibration controller 103-3A stores information regarding the determined gain in the memory unit 103-6. The information regarding the determined gain may be a value of the second control signal CTL2 that corresponds to the determined gain. The memory unit 103-6 may be implemented using a non-volatile memory device to avoid loss of data upon interruption of power.

Next, the calibration controller 103-3A generates the first control signal CTL1 to turn-off the switching unit 103-5 after the gain adjustment mode is completed. Accordingly, after the gain adjustment mode is completed, the switching unit 103-5 is turned OFF in response to the first control signal CTL1. The impedance load 103-4 is electrically cut off from the touch sensing signal path P_SEN.

Thus, the impedance load 103-4 is electrically connected to the touch sensing signal path P_SEN during the operation of the gain adjustment mode only and is electrically cut off from the touch sensing signal path P_SEN after the gain adjustment mode is completed. That is, in a normal mode other than the gain adjustment mode, the impedance load 103-4 is electrically cut off from the touch sensing signal path P_SEN, thereby having no influence on the processing of a touch sensing signal.

The gain adjustment mode may be designed to be operated whenever a system employing the touch panel 101 is initiated, or automatically operated after a predetermined time passes.

Figure 5:
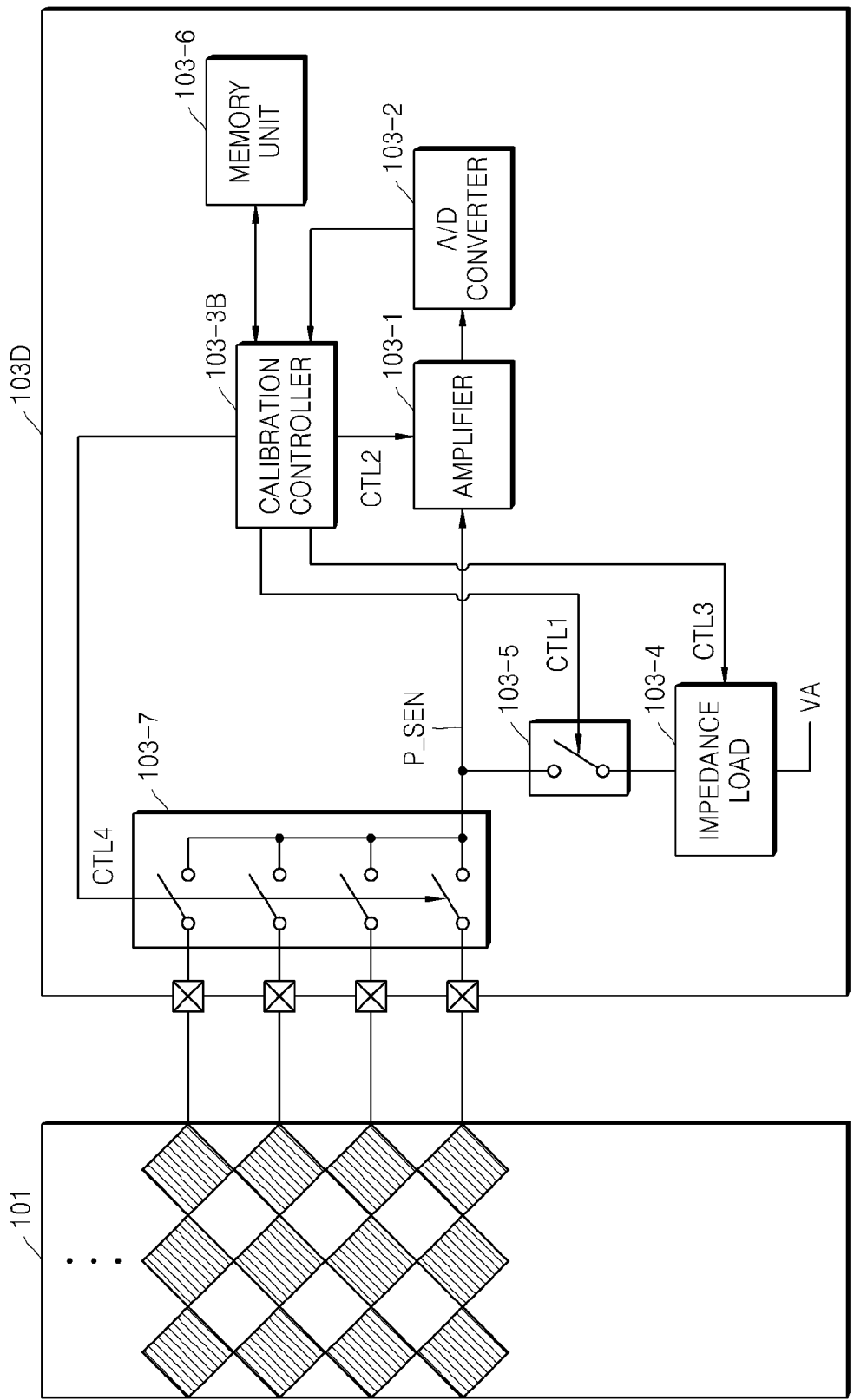
FIG. 5 is a block diagram of a touch sensing system according to another embodiment of the inventive concept.

FIG. 5 is a block diagram of a touch sensing system according to another embodiment of the inventive concept. Referring to FIG. 5, the touch sensing system again generally comprises the touch panel 101 and a calibration apparatus 103D. The calibration apparatus 103D may adjust a gain value for determining touch sensitivity when the calibration apparatus 103D is connected to the touch panel 101.

The calibration apparatus 103D illustrated in FIG. 5 comprises the amplifier 103-1, the A/D converter 103-2, a calibration controller 103-3B, the impedance load 103-4, the switching unit 103-5, the memory unit 103-6, and a multiplexer 103-7.

The calibration apparatus 103D may be arranged in a signal processing block (not shown) for outputting data to recognize a touch location by processing a touch sensing signal received from the touch panel 101, or in a touch controller (not shown) of the signal processing block. That is, the calibration apparatus 103D may be arranged in any circuit block of a circuit board or a chip that processes a touch sensing signal by being coupled to the touch panel 101.

Since the structures and operations of the amplifier 103-1, the A/D converter 103-2, the impedance load 103-4, and the switching unit 103-5 of the calibration apparatus 103D may be the same as those of the calibration apparatus 103C of FIG. 4 their descriptions will not be repeated here. However, the calibration apparatus 103C of FIG. 4 is different from the calibration apparatus 103D of FIG. 5 in that, while the touch sensing signal received through an path of a single channel from the touch panel 101 is amplified by using the single amplifier 103-1 in the calibration apparatus 103C of FIG. 4, the touch sensing signals received through paths of multiple channels are amplified by using the single amplifier 103-1 in the calibration apparatus 103D of FIG. 5.

Another operational calibration approach will be described below with reference to FIG. 5. The amount of the impedance load 103-4 is set to be an input impedance value requested when a touch input is applied to a product incorporating the touch panel 101 under the control of the calibration controller 103-3B.

In the gain adjustment mode, the calibration controller 103-3B controls the switching unit 103-5 to be turned-on and thus the impedance load 103-4 is electrically connected to the touch sensing signal path P_SEN.

The calibration controller 103-3B generates a fourth control signal CTL4 to select one of the electrodes of the multiple channels and electrically connects a selected electrode to the touch sensing signal path P_SEN, and outputs the generated fourth control signal CTL4 to the multiplexer 103-7.

The multiplexer 103-7 selects one of the electrodes of the multiple channels in response to the fourth control signal CTL4 and electrically connects the selected electrode to the touch sensing signal path P_SEN. Then, when one electrode is selected, the amplifier 103-1 amplifies and outputs a signal input through the touch sensing signal path P_SEN. The gain of the amplifier 103-1 is adjusted according to the second control signal CTL2. The amplifier 103-1 may amplify a signal with a gain set to a default value in the initial state.

The amplified signal output from the amplifier 103-1 is converted to a digital value by the A/D converter 103-2 and the digital value is input to the calibration controller 103-3B. The calibration controller 103-3B generates the second control signal CTL2 for adjusting the gain of the amplifier 103-1 by evaluating a digital value of an output signal of the amplifier 103-1 in the gain adjustment mode. As an example, the calibration controller 103-3B determines whether the digital value of an output signal falls within a target range. If the digital value is less than a lower limit value of the target range, the calibration controller 103-3B generates the second control signal CTL2 to increase the gain. If the digital value is greater than an upper limit value of the target range, the calibration controller 103-3B generates the second control signal CTL2 to decrease the gain. Accordingly, the gain of the amplifier 103-1 is adjusted in response to the second control signal CTL2.

When the digital value is included in the target range, the calibration controller 103-3B determines the gain of the amplifier 103-1 as a currently set gain and stores the determined gain in the memory unit 103-6 by matching information regarding the determined gain with the channel selected by the multiplexer 103-7. The information regarding the determined gain may be a value of the second control signal CTL2 that corresponds to the determined gain.

After the adjustment of the gain for the selected one channel is completed, the calibration controller 103-3B selects another electrode that was not selected from the electrodes of the multiple channels and electrically connects the other selected electrode to the touch sensing signal path P_SEN. In this state, the calibration controller 103-3B performs adjustment of the gain for the selected channel in the same method as described above. Then, the calibration controller 103-3B matches the information regarding the gain of a channel selected by the multiplexer 103-7 with the selected channel, and stores the information in the memory unit 103-6.

After adjustments of gain for all channels that may be selected by the multiplexer 103-7 are completed, the calibration controller 103-3B generates the first control signal CTL1 to turn-off the switching unit 103-5. Thus, after the gain adjustment mode is completed, the switching unit 103-5 is turned OFF in response to the first control signal CTL1. Accordingly, the impedance load 103-4 is electrically cut off from the touch sensing signal path P_SEN.

In a normal mode, the calibration controller 103-3B reads the information regarding the gain of the channel selected by the multiplexer 103-7 from the memory unit 103-6, and sets the gain of the amplifier 103-1.

Figure 6:
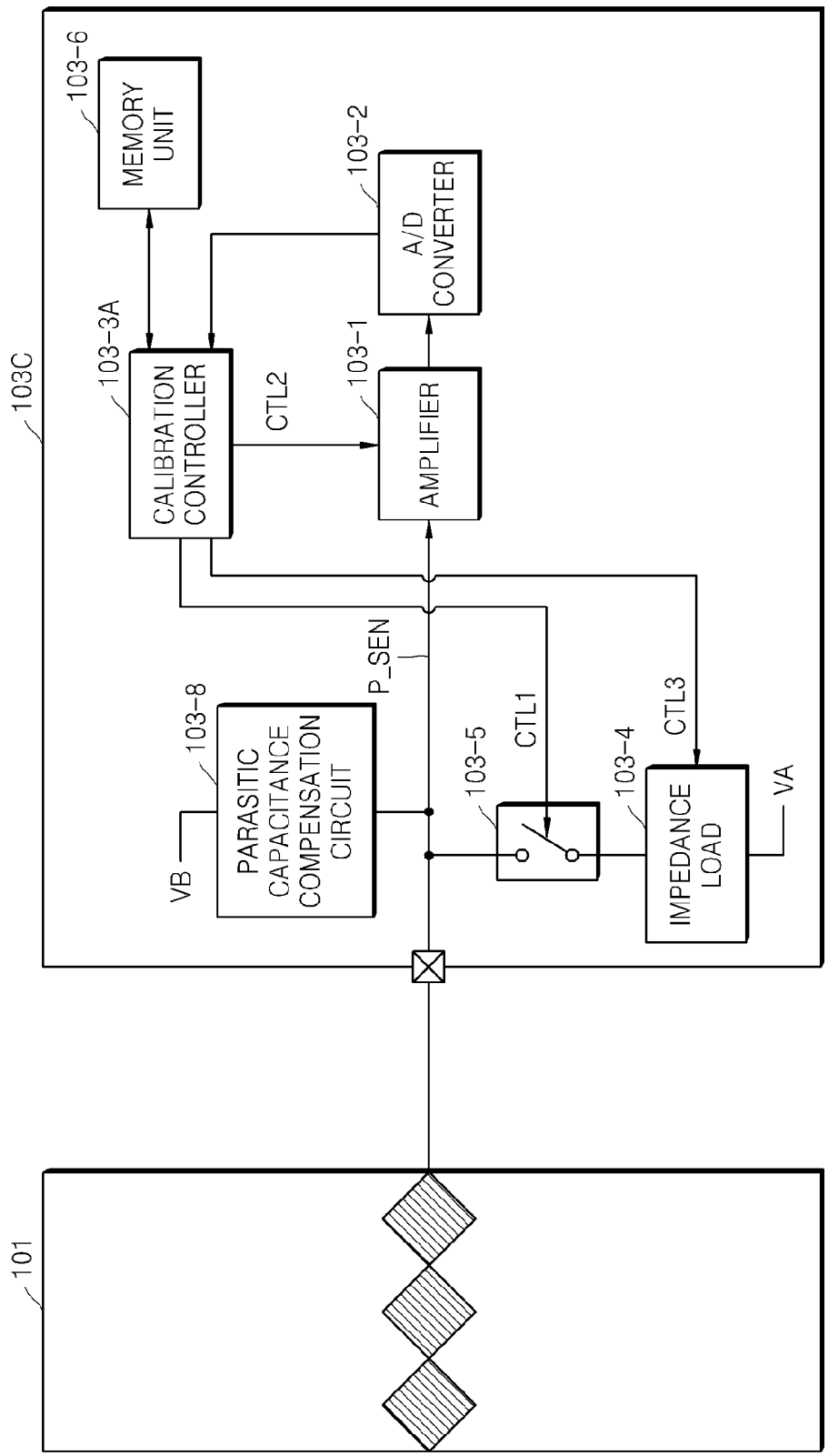
FIG. 6 is a block diagram of a touch sensing system according to another embodiment of the inventive concept.
Figure 7:
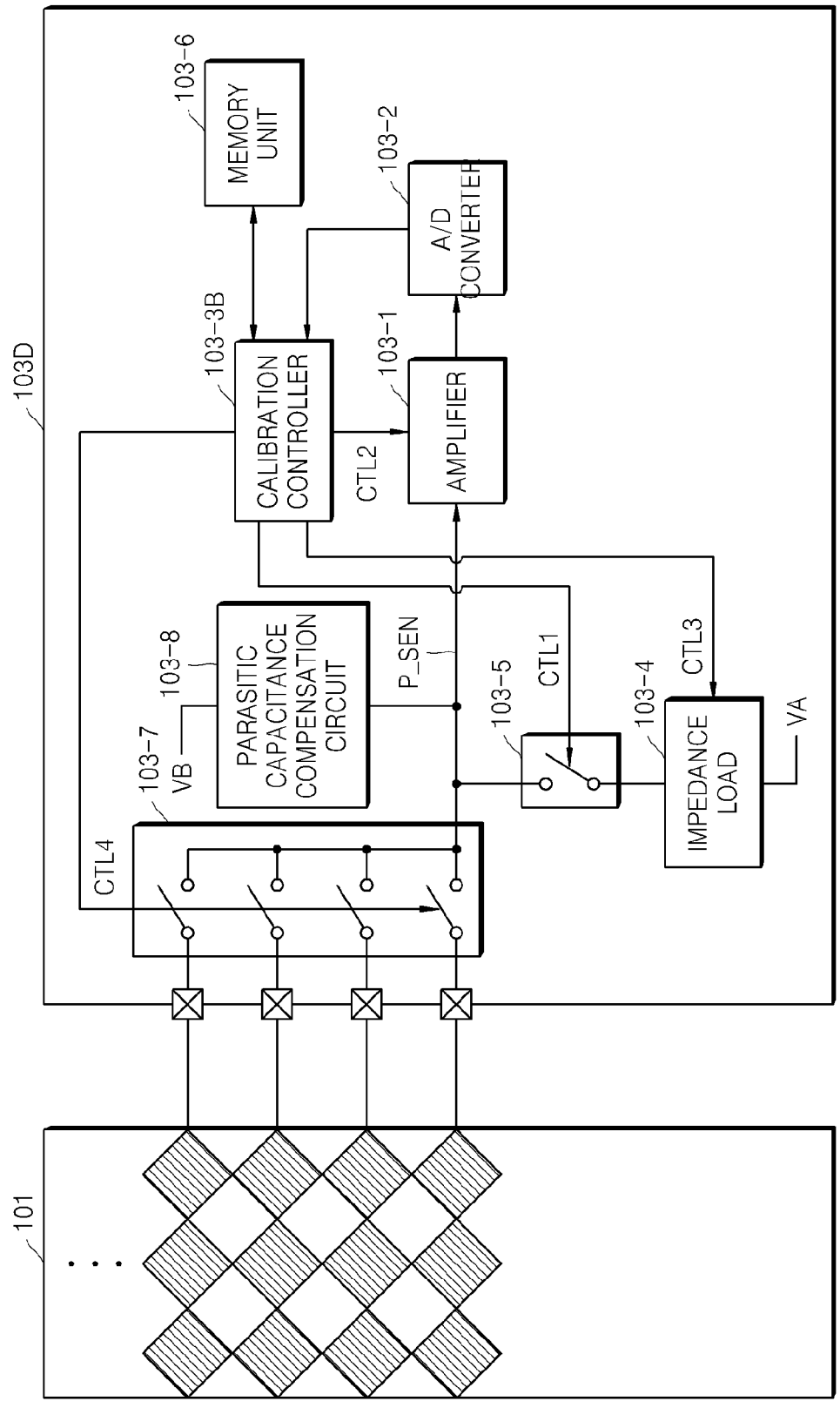
FIG. 7 is a block diagram of a touch sensing system according to another embodiment of the inventive concept.
Figure 8:
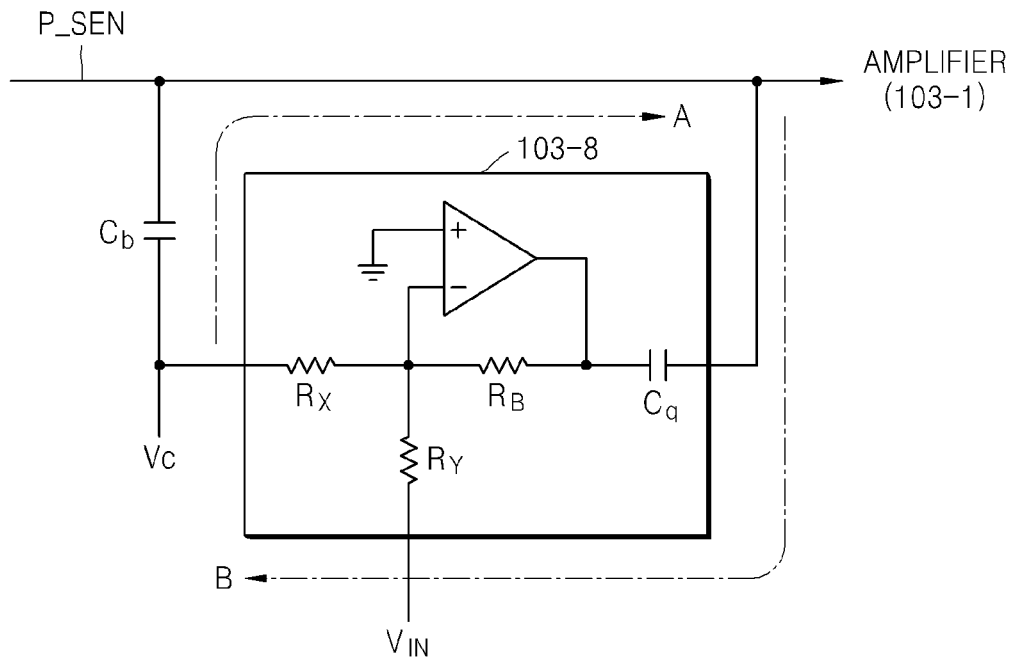
FIG. 8 is a circuit diagram illustrating a parasitic capacitance compensation circuit according to an embodiment of the inventive concept.

Next, FIGS. 6 and 7 illustrate exemplary embodiments of the touch sensing systems of FIGS. 4 and 5 to which a parasitic capacitance compensation circuit 103-8 is added in order to reduce the influence of parasitic capacitance induced from the touch sensing signal path P_SEN of the touch panel 101. FIG. 8 illustrates an example of a detailed circuit of the parasitic capacitance compensation circuit 103-8 according to an embodiment of the inventive concept.

Referring to FIG. 8, the parasitic capacitance compensation circuit 103-8, as an inversion amplifier, a common electrode voltage $V_C$ and a sensing pulse $V_{IN}$ using resistors $R_X$, $R_Y$, and $R_B$ are added and an added voltage is applied to an inversion input terminal. For reference, parasitic resistances are omitted from consideration.

The total amount of charge formed in a parasitic capacitor $C_b$ is proportional to a difference between the sensing pulse $V_{IN}$ and the common electrode voltage $V_C$, as shown in Equation 1.

$$\Delta Q_b = C_b(-V_{IN} - V_C) \qquad \text{[Equation 1]}$$

The total amount of charge formed in the negative capacitor $C_q$ to compensate for parasitic capacitance charge may be shown in Equation 2.

$$\Delta Q_b = C_q \left\{ -V_{IN} - \left( -\frac{R_B}{R_X} V_C - \frac{R_B}{R_Y} V_{IN} \right) \right\} \qquad \text{[Equation 2]}$$

Assuming that $C_q = 2C_b$, Equation 3 is established as follows.

$$\text{If } \frac{R_B}{R_X} = \frac{1}{2} \text{ and } \frac{R_B}{R_Y} = \frac{3}{2}, \qquad \text{[Equation 3]}$$

$$\Delta Q_b = \Delta Q_q$$

To compensate for the parasitic capacitor effect and satisfying the above equations, the value of the negative capacitor $C_q$ is set to be about twice the value of the parasitic capacitor $C_b$. This is because the output of an internal amplifier (not shown) of the parasitic capacitance compensation circuit 103-8 cannot exceed a power voltage.

To equalize the total charge amounts of the negative capacitor and the parasitic capacitor, the resistors $R_X$, $R_Y$, and $R_B$ is determined. The influence of the negative capacitor and the parasitic capacitor may be removed according to the conditions of Equations 1-3 and FIG. 8. However, as shown in FIG. 8, since phases of two paths A and B may be different from each other, the parasitic capacitance may not be difficult to be completely removed.

Figure 9:
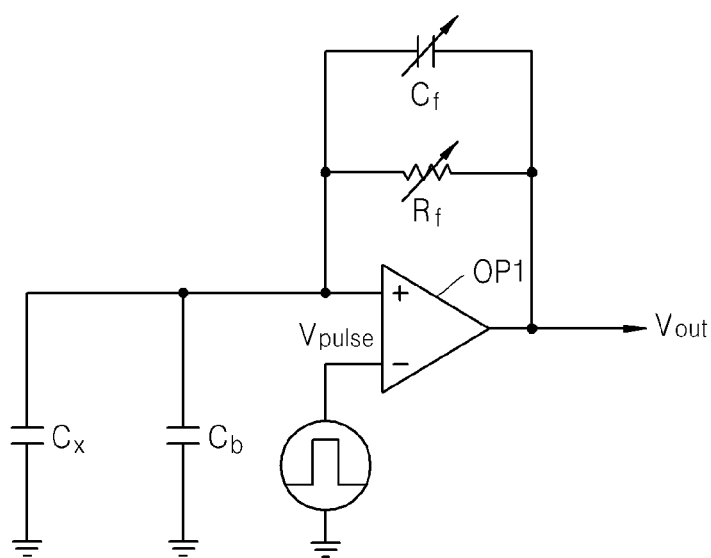
FIG. 9 is a circuit diagram illustrating one possible amplifier of a calibration apparatus of a touch sensing system according to an embodiment of the inventive concept.

Next, FIG. 9 illustrates an example of a detailed circuit structure of the amplifier 103-1 included in a calibration apparatus with respect to a capacitive overlay type touch sensing system, according to an exemplary embodiment of the present inventive concept.

Referring to FIG. 9, $C_b$ denotes parasitic capacitance induced from the touch sensing signal path P_SEN, and $C_X$ denotes capacitance generated on a touch sensing signal path. In the gain adjustment mode, $C_X$ is capacitance due to the impedance load 103-4. When a parasitic capacitance compensation circuit is in use, $C_b$ denotes remaining parasitic capacitance after parasitic capacitance is compensated for.

In FIG. 9, an output voltage $V_{out}$ and an input sensing pulse voltage $V_{pulse}$ have the relationship as shown in Equation 4.

$$\frac{V_{out}}{V_{pulse}} = 1 + \frac{s(C_X + C_b)R_f}{1 + sC_f R_f} \qquad \text{[Equation 4]}$$

Referring to Equation 4, it can be seen that the parasitic capacitance $C_b$ has an influence on gain. Accordingly, the touch sensing systems according to the present inventive concept may precisely determine gain considering the remaining parasitic capacitance.

Also, the value of the capacitor $C_f$ and/or resistor $R_f$ varies according to the second control signal CTL2 generated by the calibration controller 103-3A or 103-3B and thus the gain of the amplifier 103-1 may be adjusted. The gain of the amplifier 103-1 may be adjusted by selecting and varying only one of the capacitor $C_f$ and the resistor $R_f$. Also, the gain of the amplifier 103-1 may be adjusted by varying the values of both of the capacitor $C_f$ and the resistor $R_f$.

FIG. 9 illustrates an example in which a voltage VA applied to a terminal of the impedance load 103-4 shown in FIGS. 4-7 is set to be a ground voltage. As described above, the voltage VA may be set to a fixed DC voltage, such as ground, or to a variable voltage, such as a pulse signal.

When a sensing pulse voltage $V_{pulse}$, which is a voltage varying in the form of a pulse, is applied to the terminal of the impedance load 103-4 of FIGS. 4-7, the capacitor $C_X$ of FIG. 9 is designed to be connected to the sensing pulse voltage $V_{pulse}$, which is not a ground terminal. Also, the negative (−) input terminal of the amplifier 103-1 is designed to be connected to the ground terminal or a DC voltage terminal, instead of the sensing pulse voltage $V_{pulse}$.

Figure 10:
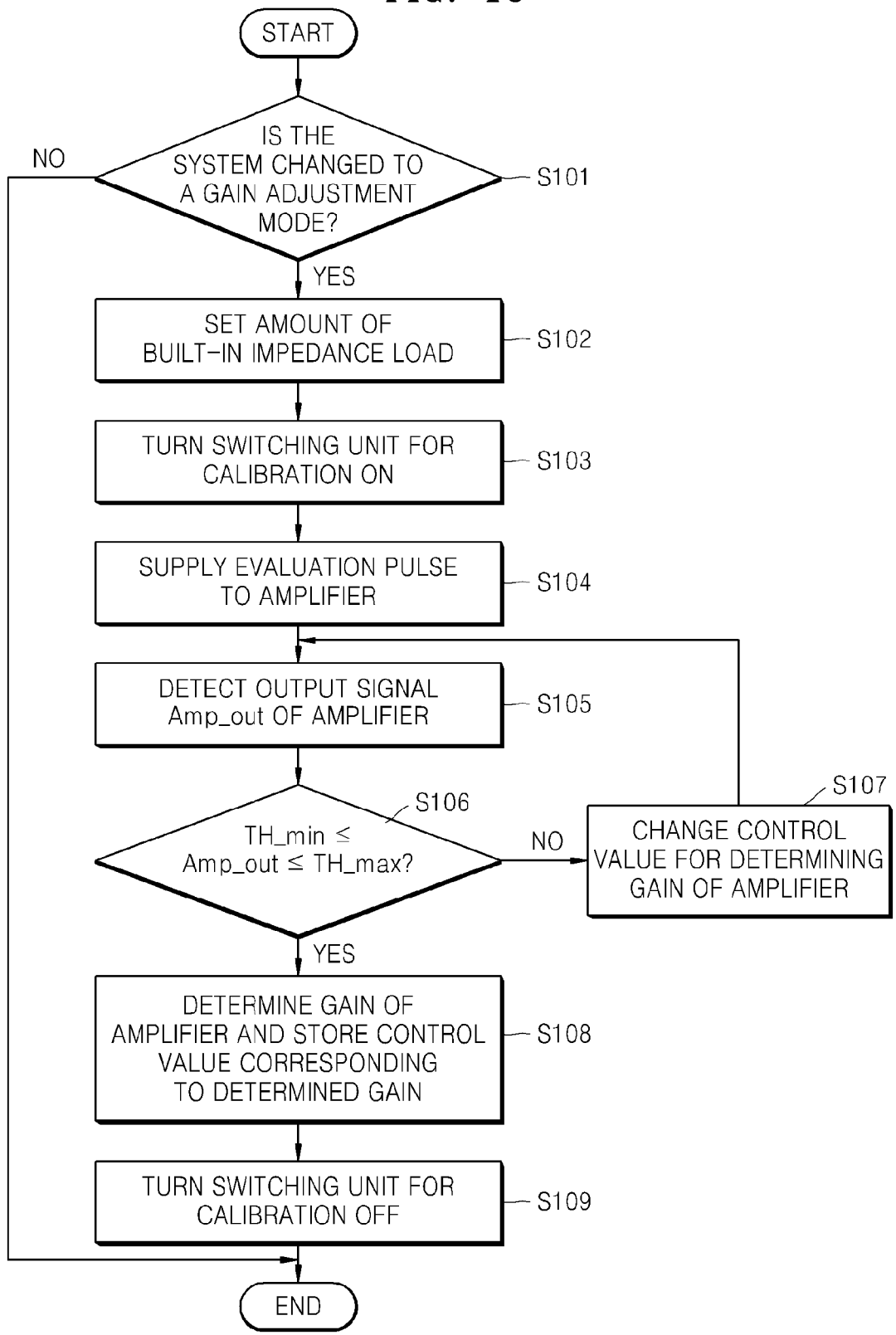
FIG. 10 is a flowchart summarizing a method of calibrating a touch sensing system according to an embodiment of the inventive concept.

Next, a method of calibrating a touch sensing system according to an embodiment of the inventive concept will be described with reference to the flowchart of FIG. 10. First, it is determined whether a system employing a touch panel is changed to a gain adjustment mode (S101). The change to the gain adjustment mode may be performed whenever the touch sensing system employing a touch panel is initialized or after a predetermined time passes. The touch sensing system employing a touch panel may include a variety of products, such as mobile phones, TVs, navigations, and ATM apparatuses.

When the shift to the gain adjustment mode is confirmed as a result of operation S101, the amount of an impedance load included in a touch sensing signal processor is set to be a value corresponding to the specification of a product employing a touch panel (S102). The impedance load may be embodied with a resistor or a capacitor. The amount of the impedance load is set to a suitable level in accordance with operating characteristics of the product incorporating the touch panel.

Next, a switching unit for calibration needed for gain adjustment is turned ON so as to electrically connect the impedance load included in the touch sensing signal processor to a touch sensing signal path (S103). A pulse for evaluation is applied to an amplifier for amplifying a signal input to the touch sensing signal path (S104).

An output signal Amp_out of the amplifier in a section in which the evaluation pulse is applied is detected (S105). The output signal Amp_out of the amplifier may be a signal obtained by converting an analog signal output from the amplifier into a digital signal.

It is determined whether the amplitude of the detected output signal Amp_out of the amplifier is included in a target range (S106). As an example, it is determined whether the amplitude of the detected output signal Amp_out of the amplifier is included between a lower limit value TH_min and an upper limit value TH_max of the target range.

When the amplitude of the detected output signal Amp_out of the amplifier is not included in the target range as a result of operation S106, a factor value for determining a gain of the amplifier according to the amplitude of the detected output signal Amp_out (S107). That is, if the amplitude of the output signal Amp_out is less than the lower limit value TH_min of the target range, the factor value for determining the gain of the amplifier is changed to increase the gain of the amplifier. If the amplitude of the output signal Amp_out is greater than the upper limit value TH_max of the target range, the factor value for determining the gain of the amplifier is changed to decrease the gain of the amplifier. As an example, when the amplifier of FIG. 10 is in use, the factor that determines the gain of the amplifier may be the capacitor $C_f$ and/or the resistor $R_f$.

When the amplitude of the output signal Amp_out is included in the target range as a result of operation S106, the gain of the amplifier is determined as a currently set gain value of the amplifier and then a control value to generate a factor value corresponding to the determined gain value is stored in a memory unit (S108). As an example, the memory unit may be a non-volatile memory device. When the amplifier of FIG. 10 is in use, a control value for determining the capacitor $C_f$ and/or the resistor $R_f$ may be stored in the memory device.

After operation S108, the switching unit for calibration needed for gain adjustment is turned OFF so that the impedance load included in the touch sensing signal processor is electrically cut off from the touch sensing signal path (S109).

When touch sensing signals received from a plurality of touch sensing electrodes of a touch panel by using a single amplifier are to be processed, the touch sensing electrodes of a touch panel are sequentially selected and electrically connected to the touch sensing signal path so that the gain of the amplifier may be adjusted for each touch sensing electrode in the above-described method. A process to remove parasitic capacitance generated on the touch sensing signal path is performed before the gain adjustment mode of FIG. 10.

Figure 11:
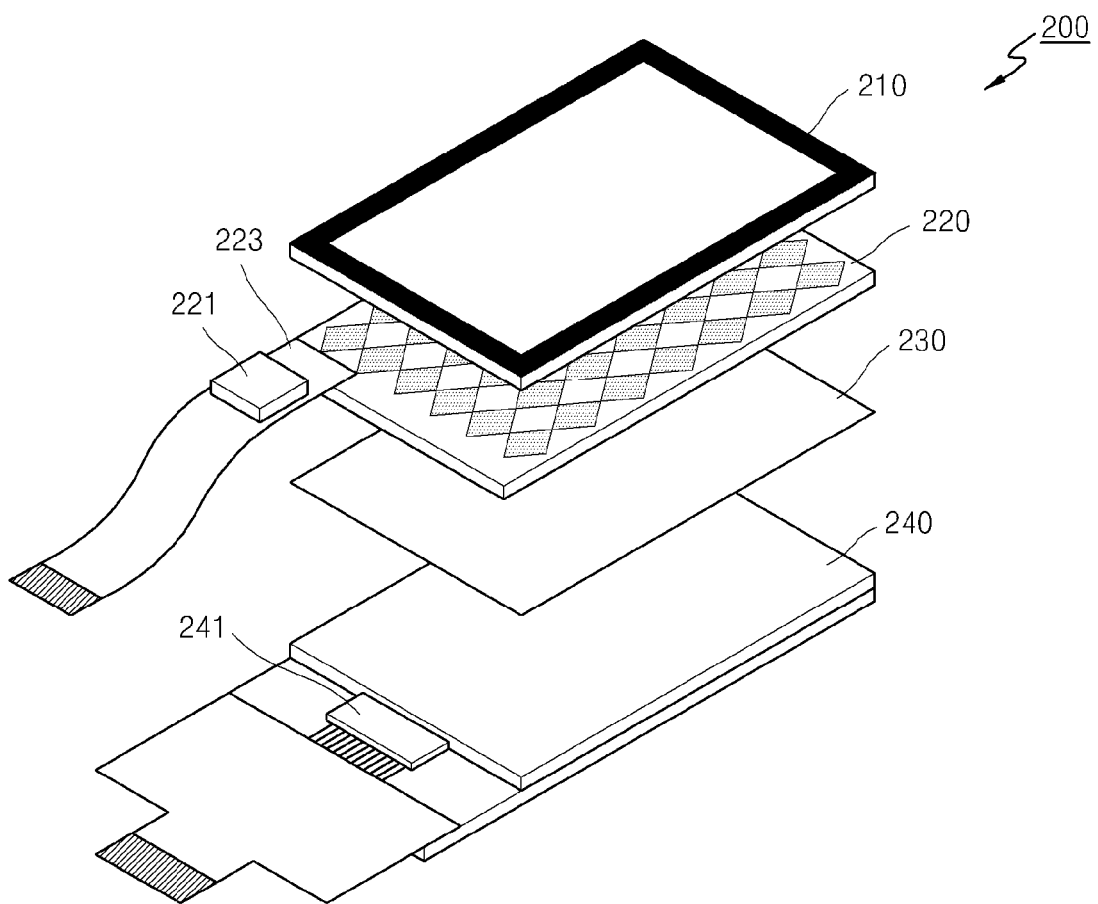
FIG. 11 is an exploded perspective view showing the structure of a PCB of a display system capable of incorporating a touch sensing system according to an embodiment of the inventive concept.
Figure 12:
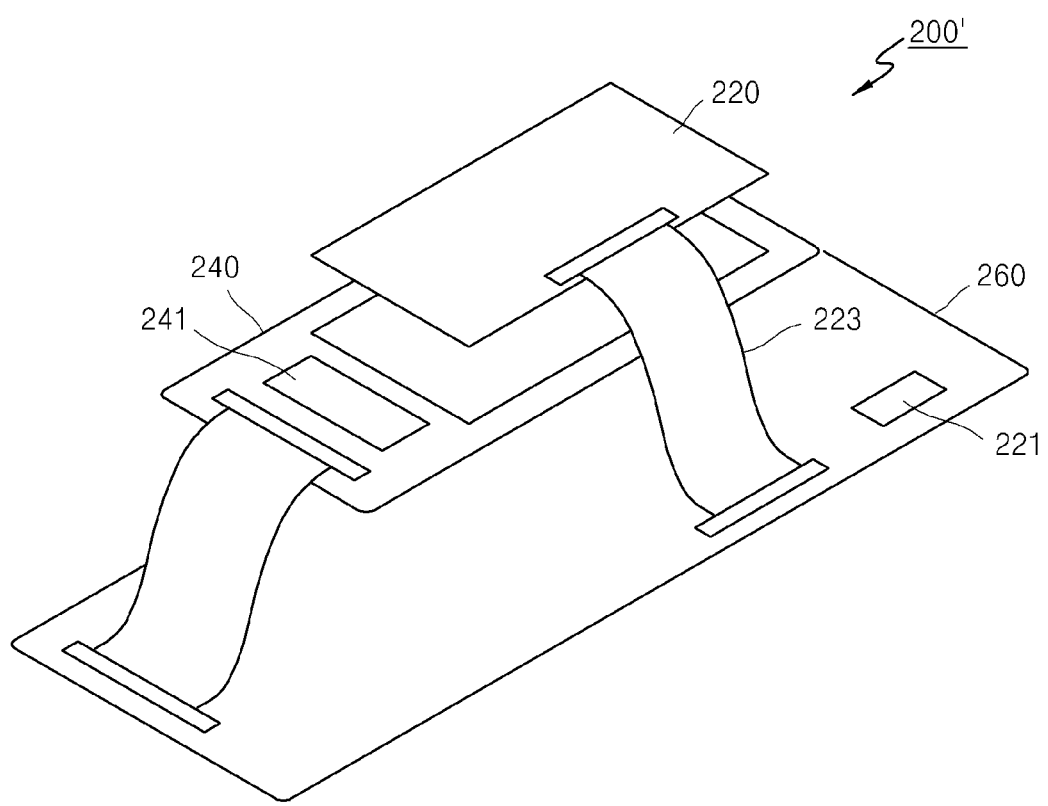
FIG. 12 is an exploded perspective view showing the structure of a PCB of a display system capable of incorporating a touch sensing system according to another embodiment of the inventive concept.
Figure 13:
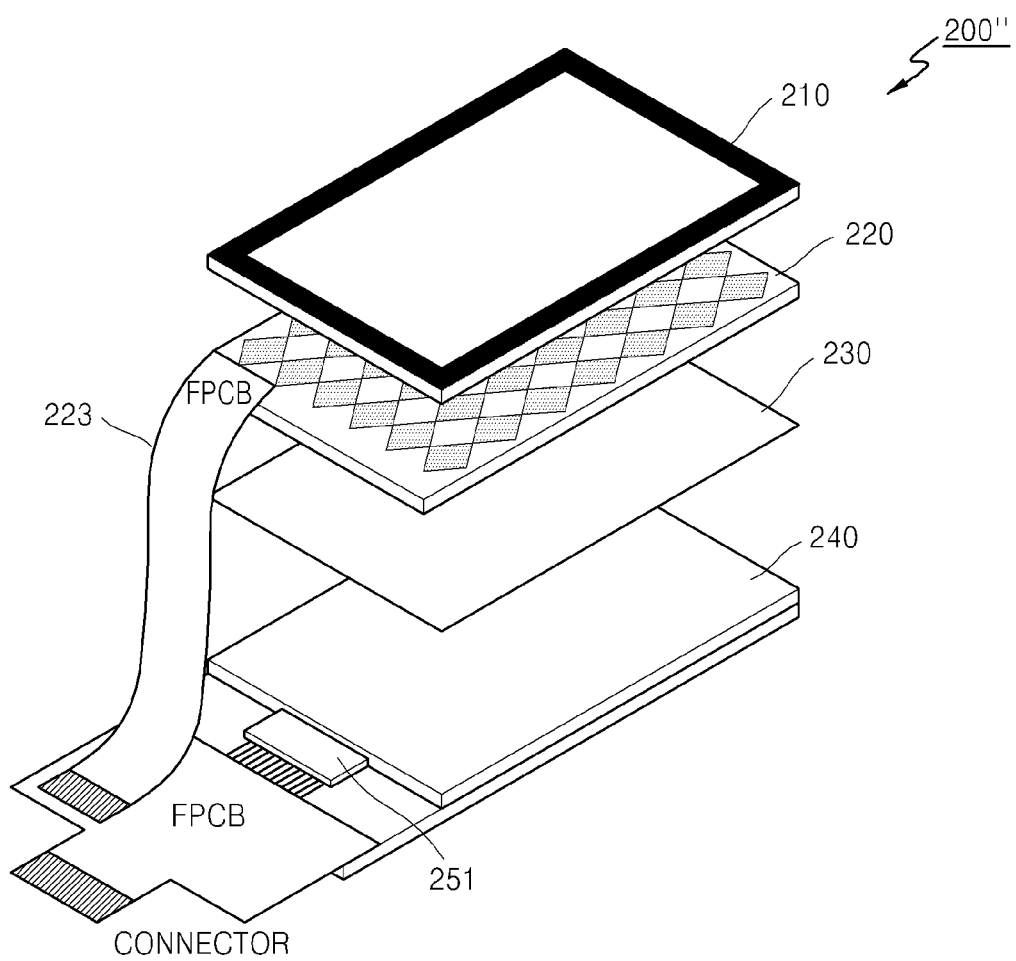
FIG. 13 is an exploded perspective view showing the structure of a PCB of a display system capable of incorporating a touch sensing system according to another embodiment of the inventive concept.

FIGS. 11-13 illustrate certain printed circuit boards (PCBs) of display systems 200 in which touch sensing systems according to embodiments of the inventive concept may be incorporated or installed. FIGS. 11-13 illustrate display systems having a structure in which a touch panel and a display panel are separated from each other.

Referring to FIG. 11, the display system 200 comprises a window glass 210, a touch panel 220, and a display panel 240. Also, a polarized panel 230 for compensating an optical characteristic may be further arranged between the touch panel 220 and the display panel 240.

The window glass 210 is generally formed of a material, such as acryl or tempered glass, so as to protect a module from scratches due to an external shock or repeated touches. The touch panel 220 is formed by patterning an electrode by using a transparent electrode, such as indium tin oxide (ITO), on a glass substrate or a polyethylene terephthalate (PET) film. A touch controller 221 may be mounted on a flexible printed circuit board (FPCB) in the form of a chip-on-board (COB). The touch controller 221 detects a change in capacitance from each electrode to extract a touch coordinate and provides an extracted touch coordinate to a host controller (not shown). The display panel 240 may be formed by combining two sheets of glasses consisting of an upper plate and a lower plate. Also, a display driving circuit 241 may be attached to a mobile display panel in the form of a chip-on-glass (COG).

FIG. 12 illustrates a structure of a PCB of a display system 200' according to another embodiment of the inventive concept. Referring to FIG. 12, the touch controller 221 may be arranged on a main board 260. Also, a voltage signal from the sensing unit may be communicated between the touch panel 220 and the touch controller 221 via a connection pattern 223. In contrast, the display driving circuit 241 may be attached to the display panel 240 in the form of the COG, as shown in FIG. 12. The display driving circuit 241 may be connected to the main board 260 by means of an FPCB. That is, the touch controller 221 and the display driving circuit 241 may communicate various information and signals via the main board 260. The touch controller 221 may include the touch sensing signal processors 103A and 103B of FIGS. 2 and 3. Also, the touch controller 221 may include the calibration apparatuses 103C, 103D, 103C, and 103D of FIGS. 4-7.

FIG. 13 illustrates a structure of a display system 200" in which the touch controller 221 and a display driving unit are integrated in a single semiconductor chip. Referring to FIG. 13, the display system 200 comprises the window glass 210, the touch panel 220, the polarized panel 230, and the display panel 240. In particular, a semiconductor chip 251 may be attached to the display panel 240 in the form of a chip-on-glass (COG). The touch panel 220 and the semiconductor chip 251 may be electrically connected to each other via the connection pattern 223. The semiconductor chip 251 may include the touch sensing signal processors 103A and 103B of FIGS. 2 and 3. Also, the semiconductor chip 251 may include the calibration apparatuses of FIGS. 103C, 103D, 103C, and 103D 4-7.

Figure 14:
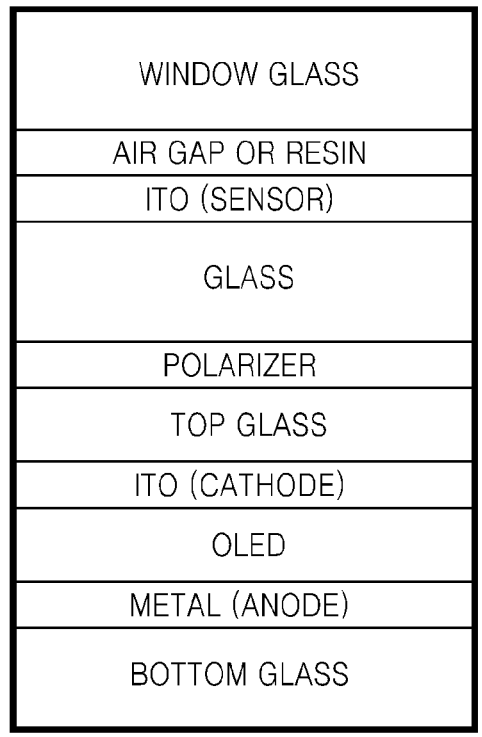
FIG. 14 is a cross-sectional diagram illustrating the structure of a panel of a display system according to an embodiment of the inventive concept.

FIG. 14 illustrates one possible structure for the panel of the display systems illustrated in FIGS. 11-13. FIG. 14 illustrates an OLED as an example of the display panel 240. Referring to FIG. 14, a sensing unit may be formed by patterning a transparent electrode (ITO (sensor)) and formed on a glass substrate separated from the display panel 240. The glass substrate on which the sensing unit is formed may be separated from the window glass by a predetermined air gap or resin. Also, the glass substrate may be separated from the upper and lower glass plates forming the display panel 240 with respect to a predetermined polarized panel.

Figure 15:
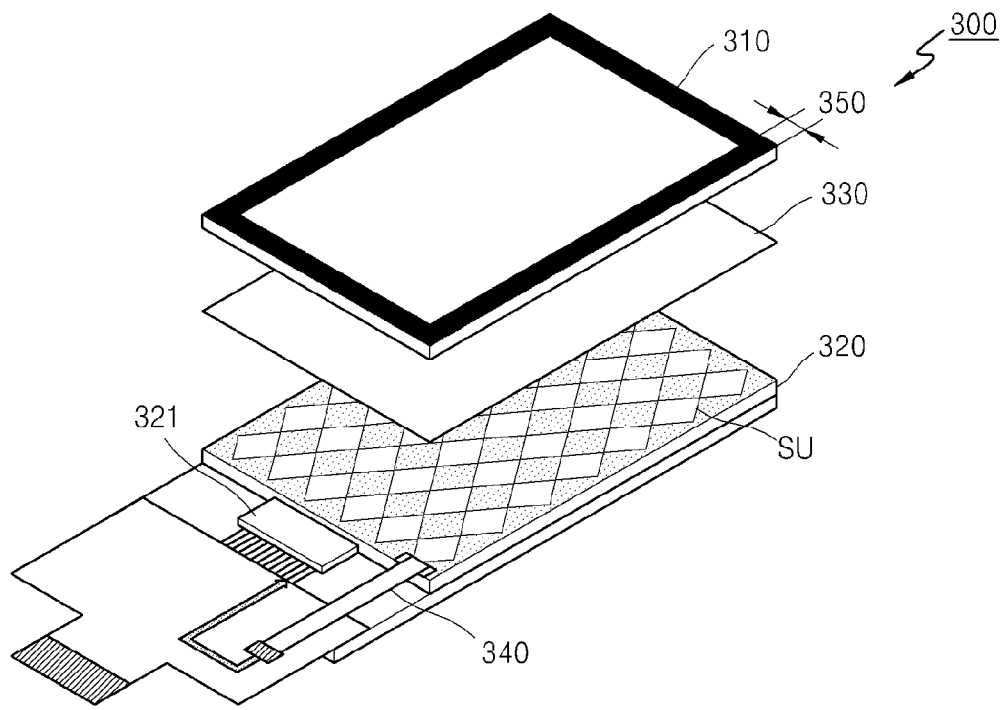
FIG. 15 is an exploded perspective view showing the structure of a PCB when a touch panel and a display panel are incorporated according to an embodiment of the inventive concept.

FIG. 15 illustrates a structure of a PCB when the touch panel and the display panel are incorporated. Referring to FIG. 15, a display system 300 comprises a window glass 310, a display panel 320, and a polarized panel 330. In particular, in embodying a touch panel, the touch panel may not be formed on a separate glass substrate, but may be formed by pattering a transparent electrode on an upper plate of the display panel 320. FIG. 15 illustrates an example of a plurality of sensing units SU being formed on the upper plate of the display panel 320. When the panel having the above structure is formed, a single semiconductor chip 321 in which a touch controller and a display driving circuit are incorporated may be employed. The semiconductor chip 321 may include the touch sensing signal processors 103A and 103B of FIGS. 2 and 3. Also, the semiconductor chip 251 may include the calibration apparatuses 103C, 103D, 103C, and 103D of FIGS. 4-7.

Figure 16:
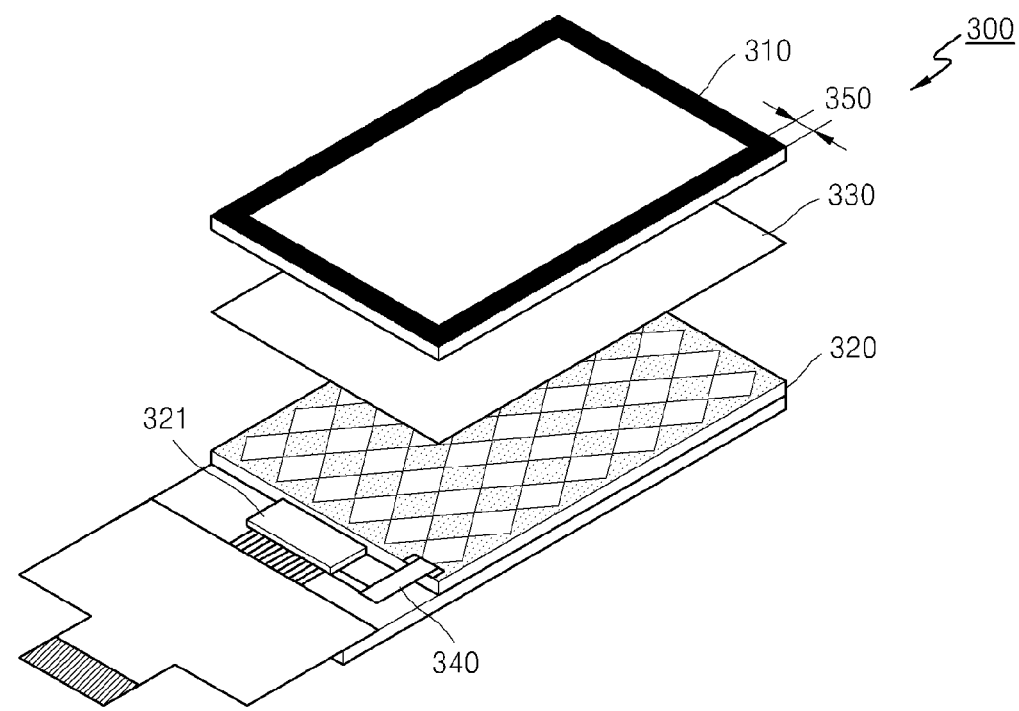
FIG. 16 is an exploded perspective view showing the structure of a PCB when a touch panel and a display panel are incorporated according to another embodiment of the present concept.

FIG. 16 illustrates an example which has a substantially similar structure to that of the display device 300 of FIG. 15 and in which a voltage signal from a sensing unit is not provided to the semiconductor chip 321 through an FPCB, but provided directly to the semiconductor chip 321 via a conductive line.

Figure 17:
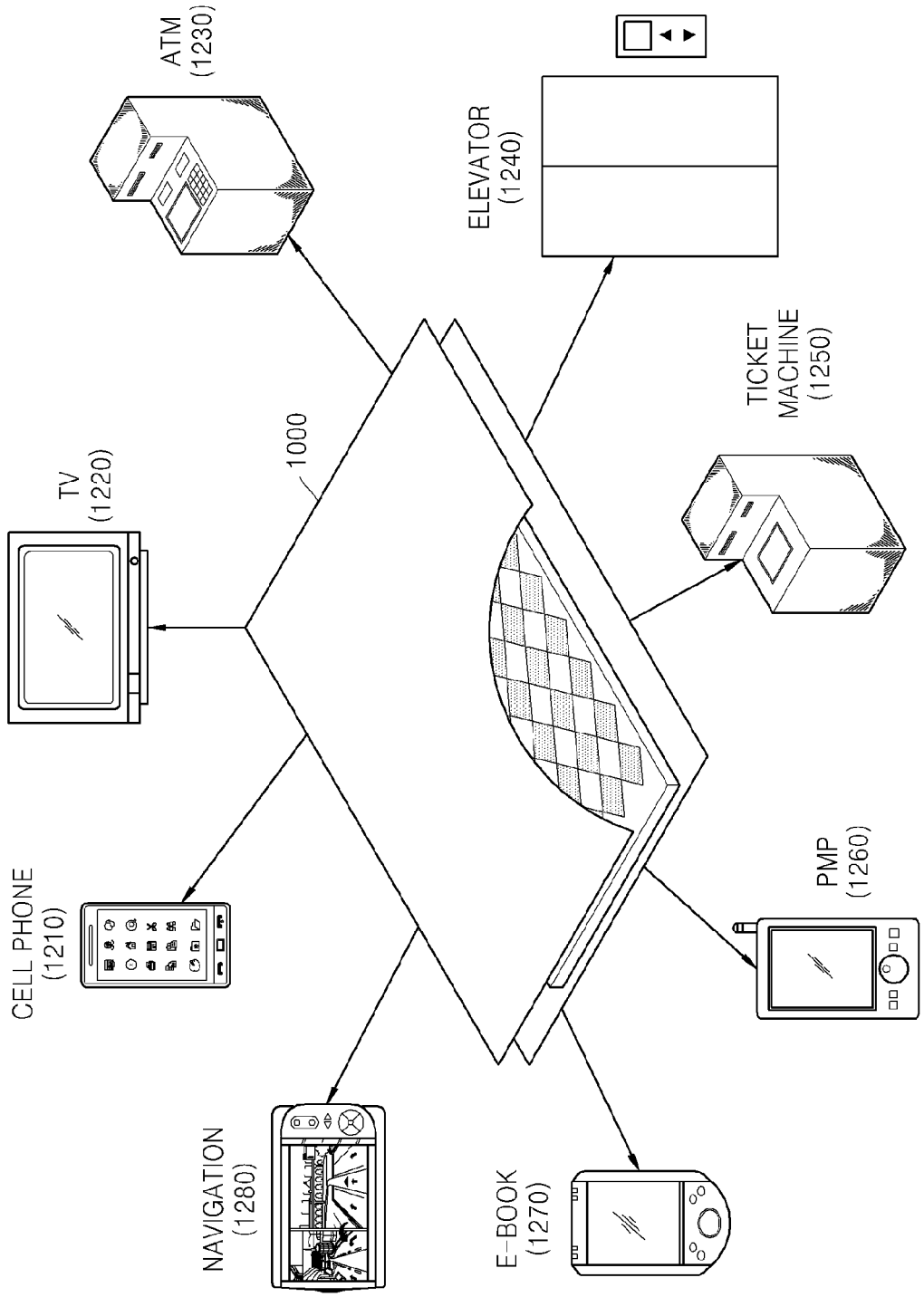
FIG. 17 illustrates certain application examples of a variety of products in which a touch sensing system according to an embodiment of the inventive concept may be incorporated.

FIG. 17 illustrates certain application examples of various products in which a touch sensing system according to an embodiment of the inventive concept may be mounted. A touch screen type product is currently used in a wide range of fields and is rapidly replacing button type devices for its spatial advantage. The most explosive demand is from the field of mobile phones. In particular, since portability and the size of a terminal are very sensitive issues in the field of mobile phones, touch type mobile phones having no separate keys or the minimum keys are widely introduced. Thus, a touch sensing system 1000 according to the present inventive concept may be employed not only in a cell phone 1210 but also in a variety of fields such as a TV 1220 employing a touch screen, an automated teller machine (ATM) 1230 that automates deposit and withdrawal of cash at banks, an elevator 1240, an automated ticket machine 1250 used in subways, for example, a portable multimedia player (PMP) 1260, an E-book 1270, and a navigation 1280. In addition, the touch display apparatus is rapidly replacing existing button type interfaces in all fields needing a user interface.

Certain embodiments of the inventive concept may be implemented, wholly or in part, as computer readable code stored on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium distributed across a number of devices connected via a network. The functional programs, codes, and code segments necessary to implement embodiments of the inventive concept may be derived by programmers skilled in the art to which the present invention pertains.

While the inventive concept has been particularly shown and described with reference to exemplary embodiments thereof, it will be understood that various changes in form and details may be made therein without departing from the scope of the following claims.

What is claimed is:

1. A method of calibrating a touch sensing system including a touch panel, the method comprising:
   connecting an impedance load to a touch sensing signal path in a gain adjustment mode, wherein the impedance load is provided in a touch sensing signal processor;
   while the impedance load is connected to the touch sensing signal path, adjusting an amplifier gain of an amplifier used to amplify a signal input to the touch sensing signal path in the gain adjustment mode by evaluating an output signal of the amplifier; and
   disconnecting the impedance load from the touch sensing signal path after the adjustment of the amplifier gain;
   wherein the amplifier is a differential amplifier comprising:
   a first input terminal directly connected to the touch sensing signal path;
   a second input terminal connected to a sensing pulse transfer path; and
   at least one of a variable resistor and a variable capacitor connected in parallel between an output terminal and the first input terminal.

2. The method of claim 1, wherein the impedance load comprises a capacitor or a resistor.

3. The method of claim 1, wherein the impedance load comprises a variable impedance load.

4. The method of claim 1, further comprising:
   setting the impedance load to be a defined value in accordance with operating characteristics of a product incorporating the touch panel before connecting of the impedance load to the touch sensing signal path.

5. The method of claim 1, wherein adjusting the amplifier gain comprises adjusting the amplifier gain to allow an amplitude of an output signal of the amplifier to fall within a target range.

6. The method of claim 1, wherein adjusting the amplifier gain comprises sequentially selecting one of a plurality of touch sensing electrodes of the touch panel using a single amplifier receiving the touch sensing signal, and
   a digital value for the amplifier gain as respectively adjusted upon selecting the one of the plurality of touch sensing electrode is stored in a memory.

7. The method of claim 1, wherein the gain adjustment mode is performed whenever a product incorporating the touch panel is initialized, or after a predetermined time passes.

8. An apparatus calibrating a touch sensing system including a touch panel, the apparatus comprising:
   an impedance load provided in a touch sensing signal processor;
   a switching unit connecting and disconnecting the impedance load with respect to a touch sensing signal path in response to a first control signal;
   an amplifier that amplifies a signal input to the touch sensing signal path, while the impedance load is connected to the touch sensing signal path, using an amplifier gain determined in response to a second control signal; and
   a calibration controller that generates the first control signal to connect the impedance load to the touch sensing signal path in a gain adjustment mode, and the second control signal to adjust the amplifier gain by evaluating an output signal of the amplifier;
   wherein the amplifier is a differential amplifier comprising:
   a first input terminal directly connected to the touch sensing signal path;
   a second input terminal connected to a sensing pulse transfer path; and
   at least one of a variable resistor and a variable capacitor connected in parallel between an output terminal and the first input terminal.

9. The apparatus of claim 8, wherein the impedance load comprises a capacitor or a resistor.

10. The apparatus of claim 8, wherein the impedance load comprises a variable impedance load.

11. The apparatus of claim 8, wherein the impedance load comprises:
    a first terminal being connected and disconnected by the switching unit with respect to the touch sensing signal path; and
    a second terminal connected to ground or a fixed DC voltage.

12. The apparatus of claim 8, wherein the impedance load comprises a first terminal connected and disconnected by the switching unit with respect to the touch sensing signal path, and a second terminal connected to a sensing pulse transfer path, and
    the amplifier comprises a first input terminal connected to the touch sensing signal path, and a second input terminal connected to ground or a fixed DC voltage.

13. The apparatus of claim 8, further comprising:
    a multiplexer that selects one of a plurality of electrodes of the touch panel and connects a selected electrode to the touch sensing signal path, wherein the calibration controller controls the multiplexer to sequentially select one of a plurality of touch sensing electrodes of the touch panel and connect a selected touch sensing electrode to the touch sensing signal path to adjust the amplifier gain in accordance with each touch sensing electrode.

14. The apparatus of claim 8, further comprising:
    a parasitic capacitance compensation circuit that removes a parasitic capacitance generated from the touch sensing signal path.

15. A touch sensing system comprising:
    a touch panel that outputs a touch sensing signal corresponding to a change in impedance of a sensing unit arranged at a plurality of sensing channels; and a touch sensing signal processor that receives the touch sensing signal from the touch panel and converts the received touch sensing signal to a signal, and outputs the signal, wherein the touch sensing signal processor comprises a calibration circuit that adjusts an amplifier gain of an amplifier amplifying a signal input to a touch sensing signal path in a state where an impedance load is connected to the touch sensing signal path in a gain adjustment mode, and the impedance load being disconnected from the touch sensing signal path after the adjustment of the amplifier gain;

wherein the amplifier is a differential amplifier comprising:

a first input terminal directly connected to the touch sensing signal path;

a second input terminal connected to a sensing pulse transfer path; and at least one of a variable resistor and a variable capacitor connected in parallel between an output terminal and the first input terminal.

16. The touch sensing system of claim 15, wherein the calibration circuit comprises:

an impedance load;

a switching unit connecting and disconnecting the impedance load with respect to a touch sensing signal path in response to a first control signal the differential amplifier; and a calibration controller that generates the first control signal to connect the impedance load to the touch sensing signal path in a gain adjustment mode, and the second control signal to adjust the amplifier gain by evaluating an output signal of the amplifier.

17. The touch sensing system of claim 16, wherein the calibration circuit further comprises a multiplexer that selects one of a plurality of electrodes of a touch panel and connects a selected electrode to the touch sensing signal path, wherein the calibration controller controls the multiplexer to sequentially select one of a plurality of touch sensing electrodes of the touch panel and connect a selected touch sensing electrode to the touch sensing signal path to adjust the amplifier gain for each touch sensing electrode.

18. An apparatus calibrating a touch sensing system including a touch panel, the apparatus comprising:

an impedance load connected to a touch sensing signal path while the apparatus operates in a gain adjustment mode, and disconnected from the touch sensing signal path while the apparatus operates in a mode other than the gain adjustment mode, wherein an amplifier gain of an amplifier applied to a signal input to the touch sensing signal path is determined during the gain adjustment mode; and a parasitic capacitance compensation circuit that removes a parasitic capacitance generated from the touch sensing signal path during the gain adjustment mode;

wherein the amplifier is a differential amplifier comprising:

a first input terminal directly connected to the touch sensing signal path;

a second input terminal connected to a sensing pulse transfer path; and at least one of a variable resistor and a variable capacitor connected in parallel between an output terminal and the first input terminal.

* * * * *